United States Patent Office 3,549,586
Patented Dec. 22, 1970

3,549,586
POLYESTER COMPOSITIONS
Percy Leighton Smith, Dunbar, and Lowell Ray Comstock, Charleston, W. Va., assignors to Union Carbide Corporation, New York, N.Y., a corporation of New York
No Drawing. Filed Apr. 1, 1969, Ser. No. 812,383
Int. Cl. C08f 21/00; C08g 51/04
U.S. Cl. 260—40                18 Claims

ABSTRACT OF THE DISCLOSURE

Polyester molding compositions containing a polymer of a cyclic ester, these compositions being resistant to shrinkage during cure, having improved surface smoothness, and superior impact resistance.

BACKGROUND OF THE INVENTION

(1) Field of the invention

The present invention relates to moldable polyester compositions characterized by little or no tendency towards shrinkage during the cure thereof, and hence, by the ability to conform closely to the surface configuration imparted by the mold. Thus, polyester compositions of the present invention exhibit superior surface smoothness, that is, "low profile," or little variation in surface smoothness.

(2) Description of the prior art

It has heretofore been recognized that linear polyesters of dihydric alcohols and an ethylenically unsaturated polycarboxylic acid, preferably a dicarboxylic acid, in which the carboxylic groups are linked to one or both of the ethylenic carbon atoms (including mixed esters of such ethylenically unsaturated polycarboxylic acids and other polycarboxylic acids), are capable of polymerization by addition reaction between the ethylenic groups of the polyester to form thermoset products. This type of material is widely disclosed, for example, in U.S. Patent 2,355,313 to Ellis, in U.S. Patents 2,409,633 and 2,443,-735 to 2,443,741 inclusive, granted to Kropa, and in U.S. Patent 2,450,552 to Hurdis.

It has also been suggested to admix liquid, or at least fusible linear ethylenically unsaturated polyesters such as are disclosed in the foregoing patents, with ethylenically unsaturated monomers, and to effect copolymerization by heating the resulting mixture in the presence of a peroxide catalyst. This reaction has been extensively discussed in the above patents as well as in numerous other patents and publications. Typical examples of publications are to be found in Industrial and Engineering Chemistry, December 1939, page 1512, and January 1940, page 64.

The foregoing polymerizable compositions undergo addition reaction, that is reaction at the points of carbon-carbon unsaturation. For instance, a polyester of maleic or fumaric acid and a glycol such as propylene glycol or diethylene glycol, in the presence fo a vinyl monomer such as styrene, is capable of gelling to form a crosslinked or cured composition.

The foregoing polymerizable compositions find considerable use as molding compositions. The compositions may be cast or molded as desired, and upon gelling or curing will form solid, cross-linked, molded products.

Such polyester compositions are frequently reinforced, as with fiber glass, molded fiber glass-polyester materials having found considerable application in industry, e.g., in the automotive industry for panels or for portions of automotive bodies, for appliance cases, in hulls for small boats, etc.

It has been observed, however, that when such polymerizable compositions gel to form a thermoset, cured composition, shrinkage occurs. This is undesirable, particularly where a molded article having a very smooth surface is desired. That is, such shrinkage results in separation of minute areas of the surface of the cured product from the mold surface, with the result that the surface of the molded product exhibits minute irregularities or unevenness and is not of the requisite smoothness. In other words, the molded product fails to accurately reproduce the dimensions and surface characteristics of the mold. Such irregularity in surface smoothness is readily determined by a profile examination of the surface. Hence, heretofore it has been necessary, in order to obtain a molded article having a truly smooth surface ("low profile"), to subject such article to costly finishing operations, e.g., multiple sanding operations and the like.

Attempts have been made to decrease the shrinkage which such polymerizable compositions undergo upon curing, as by incorporating in such compositions thermoplastic additives such as poly(methyl methacrylate), poly(vinyl chloride), and the like. However, such attempts generally have been unsatisfactory. Thus, they either have failed to significantly reduce cure-shrinkage, or where they have tended to prevent such cure-shrinkage, they have also imparted to the cured product such undesirable properties as low impact resistance, poor paint adhesion, or the like.

SUMMARY OF THE INVENTION

In accordance with the present invention, it has been found that novel curable polyester compositions are obtained from a mixture containing (1) an ethylenically unsaturated polyester, (2) a polymerizable ethylenically unsaturated monomer, and (3) a ploymer of a cyclic ester. It has further been found that such curable polyester compositions can be cured with little or no shrinkage upon cure, with the resulting novel cured compositions having superior impact resistance and paint adhesion. The curable polyester compositions can be formed or molded as desired and then cured to form novel molded products.

DESCRIPTION OF THE PREFERRED EMBODIMENTS

As noted, the three major aspects of the present invention are the following:

(A) novel curable polyester compositions from a mixture containing (1) an ethylenically unsaturated polyester, (2) a polymerizable ethylenically unsaturated monomer, and (3) a polymer of a cyclic ester;

(B) novel cured polyester compositions obtained from (A) above, which cured compositions exhibit superior impact resistance and paint adhesion; and (C) novel molded products, generally obtained by forming the curable polyester compositions to the desired shape and then curing.

The unsaturated polyesters to be used as one component of our novel curable polyester compositions are conventional in the art. The previously cited patents and article are illustrative of the fact.

The essential reactants used to prepare the ethylenically unsaturated polyester are (1) an ethylenically unsaturated polycarboxylic acid (which term is intended also to include the corresponding acid anhydride), preferably a dicarboxylic acid, and (2) a polyol, desirably a polyhydric alcohol, and preferably a dihydric alcohol. These ethylenically unsaturated polyesters generally have average molecular weights up to about 10,000, and desirably up to about 6,000, as is well documented in the literature.

Representative ethylenically unsaturated polycarboxylic acids include alkenylsuccinic acids, maleic acid, fumaric acid, itaconic acid, citraonic acid, mesaconic acid, glutaconic acid, ethylidenemalonic acid, isopropylidenemalonic acid, allylmalonic acid, muconic acid, alphahydromuconic acid, betahydromuconic acid, 4-amyl-2,5-heptadienedioic acid, 3-hexynedioic acid, tetrahydrophthalic acid, 3-carboxycinnamic acid, and the like.

Typical ethylenically unsaturated polycarboxylic acid anhydrides include pentenylsuccinic anhydride, octenylsuccinic anhydride, nonenylsuccinic anhydride, maleic anhydride, chloromaleic anhydride, dichloromaleic anhydride, itaconic anhydride, citraconic anhydride, hexachloroendomethylene-tetrahydrophthalic anhydride, otherwise known as chlorendic anhydride. Also, other useful dicarboxylic acid anhydrides, include the Diels-Alder adducts of maleic acid and alicyclic compounds having conjugated double bonds, e.g., methylbicyclo-[2.2.1]-hepten-2,3-dicarboxylic anhydride.

Of course, mixtures of the foregoing polycarboxylic acids and/or anhydrides may also be employed in the preparation of the unsaturated polyester.

As noted, the corresponding acid anhydrides are, of course, embraced under the term "acid," since the reaction products or polyesters are the same. Indeed, frequently it is preferable to operate with the anhydride rather than the free acid.

It is to be further understood that in addition to unsaturated polyesters obtained from ethylenically unsaturated polycarboxylic acids, the invention also contemplates the use of polyesters obtained from a mixture of an ethylenically unsaturated polycarboxylic acid and a saturated polycarboxylic acid. The principal functional groups in these saturated polycarboxylic acids are carboxyls that react by esterification. Such acids in the polyester add to the length of the polyester molecules but they do not enter into any cross-linking reaction. Often such saturated polycarboxylic acids improve the properties of the overall polyester.

Illustrative saturated polycarboxylic acids include hexahydrophthalic acid, phthalic acid, tetrachlorophthalic acid, succinic acid, adipic acid, suberic acid, azelaic acid, sebacic acid, dimethylsuccinic acid, and the like, as well as derivatives thereof, e.g., chlorinated derivatives.

For purposes of the present invention, the aromatic nuclei of such acids as phthalic are regarded as saturated, since the double bonds do not react by addition, as do ethylenic groups. Here, too, the term "acid" also contemplates the anhydrides of the acids. Mixtures of saturated acids are also contemplated.

It may also be desirable to include a small amount of a monocarboxylic acid as a reactant for preparing the polyester. For instance, drying oil acids impart desirable air drying characteristics to the polyester. The acids which are suitable are the saturated and unsaturated monocarboxylic acids containing up to about twenty-two carbon atoms. Preferred are aliphthatic monocarboxylic acids such as hexanoic acid, caprylic acid, lauric acid, caproic acid, myristic acid, palmitic acid, stearic acid, arachidic acid, palmitoleic acid, oleic acid, linoleic acid, linolenic acid, eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated castor oil, coconut oil, cottonseed oil, linseed oil, oiticaca oil, perilla oil, olive oil, safflower oil, sardine oil, soybean oil, tall oil, tung oil (China wood oil), and the like.

The polyol used to prepared the unsaturated polyester is advantageously a polyhydric alcohol. Polyhydric alcohols which are suitable include dihydric alcohols, such as ethylene glycol, diethylene glycol, triethyene gycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-2,4-diol, 2,2-dimethyltrimethylene glycol, hexane-1,4-diol, hexane-1,5-diol, hexane-1,6 diol, hexane-2,5-diol, 3-methylpentane-1,5-diol, 2-methylpentane-2,5-diol, 3-methylpentane-2,5-diol, 2,2-diethylpropane - 1,3 - diol, 2-ethylhexane-1,3-diol, 2,5-dimethylhexane-2,5-diol, octadecane-1,12-diol,1-butene-3,4-diol, 2-butene-1,4-diol, 2-butyne-1,4-diol, 2,5-dimethyl-3-hexyne-2,5-diol, and the like; trihydric compounds, such as glycerol, 1,1,1-trimethylolmethane, hexane-1,2,6-triol, 1,1,1-trimethylolpropane, and the like; tetrahydric compounds, such as pentaerythritol, diglycerol, and the like; and higher polyhydric compounds such as pentaglycerol, dipentaerythritol, polyvinyl alcohols and the like.

In the preparation of the polyesters, the polyol, e.g., polyhydric alcohol, is employed in slight excess of the molar equivalency of the sum of the acids. Usually, such equivalency will not much exceed 10 percent. An excess of hydroxyl equivalents facilitates reduction of the acid number of the polyester.

The ethylenically unsaturated polycarboxylic acid may constitute the whole of the acid component of the polyester, but as previoushly noted, one may include at least one or more of the saturated polycarboxylic acids. The amount of such saturated acid is capable of variation over a broad range. The minimum is, of course, none at all, and the maximum may be of the order of 10 or 12 mols per mol of the unsaturated polycarboxylic acid.

A monocarboxylic acid component is also optional, dependent upon whether an air drying polyester is desired.

In conducting the esterification of the polyol and the acid or acids, conventional principles are adhered to. Acid catalysts may be added. The esterification reaction can be conducted at a temperature in the range of from about 100° C., and lower, to about 300° C., and higher, and preferably, from about 200° C. to about 250° C. The reaction period will vary, depending, of course, on factors such as the reaction temperature, the cencentrations and reactivities of the reactants selected, the presence or absence of a catalyst, and the like. In general, a reaction period of from 0.5 to about 24 hours is adequate to give a product generally having an acid value below about 50. The acid value is defined as the number of milligrams of potassium hydroxide required to neutralize the free acid in one gram of product. Water resulting from the esterification reaction can be removed by methods well known to the art, for example azeotropic distillation. The esterification is desirably carried out under a nitrogen blanket, but this is not essential.

The polymerizable ethylenically unsaturated monomers which are contemplated as the second component of our novel curable polyester compositions are well known. Preferably such compounds are liquids, and desirably they contain the reactive group $H_2C=C<$. It is preferred that the monomeric ethylenically unsaturated compound contain no functional groups, other than the polymerizable ethylenic group(s). Illustrative monomeric ethylenically unsaturated compounds include, for example, the mono- and polyolefinic hydrocarbons, e.g. isoprene, the heptenes, the octenes, the nonenes, butadienes, pentadiene, hexadiene, heptadiene, octadiene, cyclopentene, cyclohexene, cycloheptene, lower alkyl substituted-cylohexene, lower alkyl substituted-cyclopentene, ethylcyclohexene, n-propylcycloheptene, styrene, alkylstyrene, chlorostyrene, ethylstyrene, dimethylstyrene, isopropylstyrene, divinyl benzene, and the like; the olefinic esters and ethers, e.g., divinyl ether, diallyl ether, di(2-butenyl) ether, di(2-pentenyl) ether, vinyl allyl ether, vinyl isobutyl ether, methyl acrylate, methyl crotonate, methyl methacrylate, ethyl acrylate, ethyl crotonate, ethyl methacrylate, propyl acrylate, propyl crotonate, propyl methacrylate, allyl crotonate, allyl acrylate, allyl methacrylate, allyl butyrate, allyl 2-ethyl-hexanoate, vinyl benzoate, allyl benzoate, di-alllylphthalate, methyl linoleate, ethyl linolenate, alkyl methacrylate, alkyl crotonate, alkyl oleate, and the like; the olefinic mono-carboxylic acids, e.g., acrylic acid, crotonic acid, methacrylic acid, and the like. Other monomeric ethylenically unsaturated compounds include, for example, triallyl cyanurate, triallylamine, vinyl chloride, acrylonitrile, and the like. The mono- and polyallyl ethers, the mono- and polyallyl esters, and the alkyl acrylates are preferred. Specific examples of highly preferred monomeric ethylenically unsaturated compounds include, among others, diallyl phthalate, triallyl cyanurate, ethyl acrylate, styrene, and methyl methacrylate. Styrene is most preferred. Mixtures of any two or more of the ethylenically unsaturated compounds with the unsaturated polyester are also contemplated.

The amount of ethylenic monomer that may be admixed with the polyester may vary within wide limits. The monomer usually will comprise from about 10 to about 60 percent upon a weight basis of the copolymerizable mixture, i.e., ethylenically unsaturated monomer plus ethylenically unsaturated polyester, and mixtures containing from about 20 to about 50 percent by weight of monomer are to be preferred.

In order to prevent possible premature polymerization of the copolymerizable mixture, it is desirable to incorporate therein a suitable inhibitor such as, e.g., hydroquinone.

The third component of our novel curable polyester composition is a polymer of a cyclic ester.

The polymers of cyclic esters which are contemplated in the practice of the invention are those which possess a reduced viscosity value of at least about 0.15, and desirably from about 0.2 to about 15, and higher. The preferred polymers of cyclic esters have a reduced viscosity value of from about 0.25 to about 5. These polymers are further characterized by the following recurring linear structural Unit I:

I

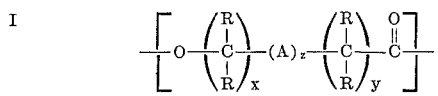

wherein each R, individually, is hydrogen, alkyl, halo, or alkoxy; wherein A is the oxy group; wherein $x$ is an integer from 1 to 4; wherein $y$ is an integer from 1 to 4; wherein $z$ is an integer of zero or one; with the provisos that (a) the sum of $x+y+z$ is at least 2 and not greater than 7, (b) the sum of $x+y+z$ cannot equal 3, and (c) the total number of R variables which are substituents other than hydrogen does not exceed 3, preferably does not exceed 2. Illustrative R variables include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed 8.

In one embodiment, highly desirable polymers of cyclic esters which are contemplated are characterized by both recurring structural Unit I supra and recurring structural Unit II:

II

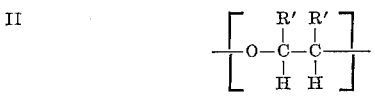

wherein each R′, individually, is hydrogen, alkyl, cycloalkyl, aryl, or chloroalkyl, or in which the two R′ variables together with the ethylene moiety of the oxyethylene chain of Unit II form a saturated cycloaliphatic hydrocarbon ring having from 4 to 8 carbon atoms, desirably from 5 to 6 carbon atoms. It is preferred that recurring Unit II contain from 2 to 12 carbon atoms. Illustrative R′ variables include methyl, ethyl, n-propyl, isopropyl, t-butyl, the hexyls, the dodecyls, 2-chloroethyl phenyl, phenethyl, ethylphenyl, cyclopentyl, cyclohexyl, cycloheptyl, and the like. It is preferred that R′ be hydrogen, lower alkyl, e.g., methyl, ethyl, n-propyl, isopropyl; chloroalkyl, e.g., 2-chloroethyl; and the like.

The aforedescribed recurring linear unit (I) is interconnected through the oxy group (—O—) of one unit with the carbonyl group

of a second unit. In different language, the interconnection of these units does not involve the direct bonding of two carbonyl groups, i.e.,

With relation to the relatively high molecular weight cyclic ester polymers, the terminal moieties thereof are not determinable by infrared analysis, which factor is readily understandable since macromolecules are involved. On the other hand, the relatively low molecular weight cyclic ester polymers, e.g., those having reduced viscosity values below about 0.3, are characterized by end groups which can be hydroxyl; carboxyl; hydrocarbyl such as alkyl, cycloalkyl, aryl, aralkyl, and alkaryl; hydrocarbyloxy such as alkoxy, cycloalkoxy, aryloxy, aralkoxy, and alkaryloxy; and possibly other moieties such as catalyst residue; and mixtures of the foregoing. If desired, the hydroxyl and carboxyl end groups, if present, can be esterified or acylated such as by reacting the hydroxyl moiety with a monocarboxyl compound or its corresponding anhydride, e.g., acetic acid, acetic anhydride, butyric acid, 2-ethylhexanoic acid, benzoic acid, etc., or by reacting the carboxyl moiety with a monohydroxyl compound such as a monohydric alcohol or monohydric phenol, e.g., methanol, 2-ethylhexanol, isobutanol, phenol, and the like.

When the cyclic ester polymers are prepared from a mixture containing the cyclic ester monomer and minor amounts of a cyclic comonomer which is copolymerizable therewith, e.g., cyclic carbonates and cyclic ethers such as alkylene oxide, oxetane, tetrahydrofuran, etc., the polymeric chain of the resulting copolymeric product will be characterized by both recurring linear Unit I supra as well as the recurring linear Unit II (which would represent the alkylene oxide comonomer polymerized therein) or/and by a recurring linear unit which would correspond to the additional polymerizable cyclic comonomer in the monomeric mixture. When the comonomer is an alkylene oxide, then the resulting copolymeric product will contain both recurring linear Unit I and recurring linear Unit II in the copolymeric chain thereof. The interconnection of linear Unit I and linear Unit II supra does not involve or result in the direct bonding of two oxy groups, i.e., —O—O—. In other words, the oxy group (—O—) of recurring linear Unit II is interconnected with the carbonyl group

of recurring linear Unit I supra or with the alkylene moiety of a second oxyalkylene unit (II).

By way of a second illustration, when a comonomer such as a cyclic carbonate, e.g., trimethylene carbonate, is employed in the polymerization process, the resulting copolymeric product will contain recurring linear carbonate units in the copolymeric chain thereof, e.g.,

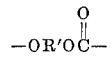

wherein R′ is alkylene such as trimethylene. Such linear carbonate units are characterized by an oxy group (—O—) at one end and an oxycarbonyl group

at the other end, and these linear carbonate units will interconnect with another linear unit such as linear Unit I supra in the manner described previously. That is to say, the oxy group of one linear unit will interconnect with the carbonyl group of a second unit.

Particularly preferred polymers of cyclic esters are those which are characterized by the oxypentamethylenecarbonyl chain as seen in recurring structural Unit III:

III
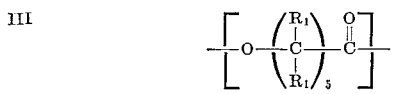

wherein each $R_1$ is hydrogen or lower alkyl, preferably hydrogen or methyl, with the proviso that no more than three $R_1$ variables are substituents other than hydrogen.

The preparation of the cyclic ester polymers are well documented in the patent literature as exemplified by U.S. Pat. Nos. 3,021,309 through 3,021,317; 3,169,945; and 2,962,524. Briefly, the process involves the polymerization of an admixture containing at least one cyclic ester monomer with or without a functional initiator therefor, and a suitable catalyst, the choice of which will depend on the presence or absence of added initiator.

Suitable monomeric cyclic esters which can be employed in the manufacture of the cyclic ester polymers are best illustrated by the following formula:

IV
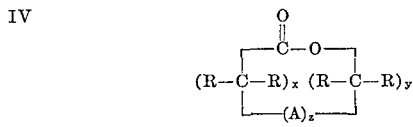

wherein the R, A, x, y, and z variables have the significance noted in Unit I supra.

Representative monomeric cyclic esters which are contemplated include, for example, alpha, alpha-dimethyl-beta-propiolactone; delta-valerolactone; epsilon-caprolactone; zeta-enantholactone; eta-caprylolactone; the monoalkyl-delta-valerolactones, e.g., the monomethyl-, monoethyl-, monohexyl-, delta-valerolactones, and the like; the dialkyl-delta-valerolactones, e.g., the dimethyl-, diethyl-, and di-n-octyl-delta-valerolactones, and the like; the monoalkyl-dialkyl-, and tri-alkyl-epsilon-caprolactones, e.g., the monomethyl-, monoethyl-, monohexyl-, dimethyl-, diethyl-, di-n-propyl, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., the monomethoxy-, monoisopropoxy-, dimethoxy-, and diethoxy-delta-valerolactones and epsilon-caprolactones, and the like; 1,4-dioxane-2-one; and the like. A single cyclic ester monomer or mixtures of such monomers may be employed.

In the absence of added functional initiator, the polymerization process is desirably effected under the operative conditions and in the presence of anionic catalysts as noted in U.S. Pat. Nos. 3,021,309 through 3,021,317 such as dialkylzinc, dialkylmagnesium, dialkylcadmium, trialkylaluminum, dialkylaluminum alkoxide, alkylaluminum dialkoxide, dialkylaluminum halide, aluminum trialkoxide, alkyllithium, and aryllithium. Specific anionic catalysts would include di-n-butylzinc, diethylmagnesium, di - n - butylmagnesium, dimethylcadmium, diethylcadmium, di - n - butylcadmium, triethylaluminum, triisobutylaluminum, tri-2-ethylhexylaluminum, aluminum triisopropoxide, aluminum triethoxide, ethyllithium, n-butyllithium, phenyllithium, and the like.

When employing an admixture containing cyclic ester monomer and functional initiator which possesses at least one active hydrogen substituent, e.g., amino, carboxyl, and hydroxyl, it is desirable to use the catalysts noted in U.S. Pat. Nos. 2,878,236, 2,890,208, 3,169,945, and 3,284,417 under the operative conditions discussed therein. In these processes the active hydrogen substituent on the initiator is capable of opening the monomer cyclic ester ring whereby said cyclic ester is added to said initiator as a substantially linear group. The molecular weight of the resulting polymers of cyclic ester can be predetermined by controlling the molar ratios of cyclic ester monomer to be added to the functional initiator. Amino and hydroxyl substituents on the initiator will result in polymeric products having hydroxyl end-groups. Carboxyl substituents on the initiator will result in polymeric products having carboxyl end-groups. The initiator will thus be contained in the final polymeric molecule. The esterification or acylation of the aforementioned end-groups has been described previously and is voluminously documented in the art.

Polymers of cyclic esters can also be manufactured via the process described in U.S. Pat. No. 2,962,524. In this process, a monomeric admixture comprising cyclic ester and alkylene oxide which desirably has the formula

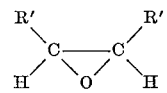

wherein each R', individually, has the meanings noted in Unit II supra, can be reacted with a polyfunctional initiator possessing amino, hydroxyl, and/or carboxyl groups, preferably in the presence of a Lewis acid catalyst such as boron trifluoride. The reuslting polymeric products have hydroxyl termination which can be converted to acyloxy or hydrocarbyloxy moieties by conventional techniques. Illustrative alkylene oxides would include ethylene oxide, propylene oxide, the butylene oxides, styrene oxide, epichlorohydrin, cyclohexene oxide, and the like.

Cyclic ester/alkylene oxide copolymers can also be prepared by reacting an admixture comprising cyclic ester and alkylene oxide monomers, an interfacial agent such as a solid, relatively high molecular weight poly (vinyl stearate) or lauryl methacrylate/vinyl chloride copolymer (reduced viscosity in cyclohexanone at 30° C. of from about 0.3 to about 1.0), in the presence of an inret normally-liquid saturated aliphatic hydrocarbon vehicle such as heptane, phosphorus pentafluoride as the catalyst therefor, at an elevated temperature, e.g., about 80° C., and for a period of time sufficient to produce such cyclic ester/alkylene oxide copolymers.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of solvent (e.g., cyclohexanone, benzene, chloroform, toluene, or other common organic solvents) at 30° C.

The amount of cyclic ester polymer contained in the novel curable polyester composition should be from about 1 to 40 weight percent, based on the total weight of ethylenically unsaturated polyester plus ethylenically unsaturated monomer. Lower concentrations, it was observed, resulted in less smoothness and gloss in the final molded product, whereas higher concentrations resulted in poor paint adhesion. A preferred range is from about 5 to about 25 weight percent, with a range of from about 10 to about 20 weight percent being most preferred.

The particular means of preparing the novel curable polyester composition does not appear to be critical. Thus, one convenient method is to form a solution of the cyclic ester polymer in the ethylenically unsaturated monomer that is to be copolymerized with the unsaturated polyester. The foregoing solution is then mixed with a mixture containing the unsaturated polyester and ethylenically unsaturated monomer, to thereby form a three component mixture containing cyclic ester polymer, ethylenically unsaturated monomer, and unsaturated polyester.

Of course, the foregoing novel curable polyester composition may also contain other ingredients such as a suitable filler. Such fillers are well known in the art and include, by way of example, fiber glass; clay; calcium carbonate; silica fillers such as mica, quartz, talc, magnesium silicate and the like; hydrated alumina; etc. When a filler is employed, it is advantageously used in an amount of from about 20 to about 75 percent by weight of the overall mixture, i.e., ethylenically unsaturated polyester plus ethylenically unsaturated monomer plus cyclic ester polymer plus filler.

To effect the cure of the novel curable polyester composition comprising (1) cyclic ester polymer, (2) ethylenically unsaturated monomer, and (3) unsaturated polyester, which may, as noted, contain additional ingredients, a peroxide catalyst is desirably employed.

Any organic peroxide that functions as a free radical type polymerization initiator can be used to effect curing. Examples of such peroxides are hydroperoxides, e.g., tertiary-butylyhdroperoxide, cumene hydroperoxide, para-menthanehydroperoxide, etc.; peroxy esters, e.g., di-t-butyl diperoxyphthalate, t-butyl peroxyacetate, etc.; alkyl peroxides, e.g., di-t-butyl peroxide, dibenzyl peroxide, etc.; ketone peroxides, e.g., methyl ethyl ketone peroxide, cyclohexanone peroxide, etc.; and acyl peroxides, e.g., benzoyl peroxide, para-chlorobenzoyl peroxide, 2,4-dichlorobenzoyl peroxide, lauroyl peroxide, etc.

Advantageously, the novel curable polyester composition comprising the cyclic ester polymer, ethylenically unsaturated monomer, ethylenically unsaturated polyester, curing catalyst, and optionally, filler and possibly other ingredients, is cast or otherwise formed or molded to the desired shape, and is then cured.

The curing conditions of temperature and time are well known in the art, the selection of a particular temperature and time depending upon the specific components employed in the curable polyester composition as well as upon the nature of particular cured product desired. Thus, the temperature of the cure can vary over wide limits, e.g., from about 22° C. to about 150° C. or higher. The temperature should not be so high as to volatilize the monomer or to char or discolor the final product. The time of curing and baking, of course, will vary greatly depending upon such factors as the size and thickness of the body to be formed and the temperature of reaction. Usually 0.5 minute to several hours, e.g., two hours, is sufficient.

The novel cyclic ester polymer, ethylenically unsaturated monomer, ethylenically unsaturated polyester compositions of the present invention can, of course, be utilized in accordance with conventional molding techniques to obtain molded products as desired. Thus, they may be cast or may be used in premix molding, preform molding, etc., as is illustrated in the examples hereinafter.

In the subsequent examples the ethylenically unsaturated polyester employed was obtained by reacting maleic anhydride, phthalic anhydride, and propylene glycol, the details of preparation being more particularly described in Example 1 hereinafter. Of course, and as previously noted, other ethylenically unsaturated polyesters may be utilized in accordance with the present invention. Likewise, while in the following examples styrene was employed as the ethylenically unsaturated monomer, other ethylenically unsaturated monomers are also suitable. Thus, other admixtures of ethylenically unsaturated polyesters and ethylenically unsaturated monomers that are of commercial interest include, e.g., an ethylenically unsaturated polyester obtained by reacting maleic acid and dipropylene glycol, in admixture with an ethylenically unsaturated monomer such as vinyl toluene or styrene; an ethylenically unsaturated polyester obtained by reacting maleic acid, isophthalic acid, and propylene glycol, in admixture with styrene; and the like.

In the subsequent examples, the following definitions are employed.

PCL (0.3) represents epsilon-caprolactone polymer having a reduced viscosity of 0.3, having been prepared by reacting epsilon-caprolactone using monobutyl ether of diethylene glycol initiator in the presence of stannous octoate catalyst.

PCL (1.89) represents epsilon-caprolactone polymer having a reduced viscosity of 1.89, having been prepared by dispersion polymerization using about 3 percent vinyl chloride/lauryl methacrylate copolymer as an interfacial agent and employing aluminum triisobutyl as the catalyst.

PDV (0.48) represents delta-valerolactone polymer having a reduced viscosity of 0.48, having been prepared by bulk polymerization using dibutyl zinc catalyst.

CL/MCL (1.39) represents a copolymer of 70 mole percent epsilon-caprolactone/30 mole percent methyl-epsilon-caprolactone, having a reduced viscosity of 1.39, having been prepared by dispersion polymerization using vinyl chloride/lauryl methacrylate copolymer as an interfacial agent and employing aluminum triisobutyl as the catalyst.

CL/ETO (0.28) represents a copolymer of 70 mole percent epsilon-caprolactone/30 mole percent ethylene oxide, having a reduced viscosity of 0.28, having been prepared from epsilon-caprolactone and ethylene oxide using ethylene glycol initiator in the presence of boron trifluoride etherate catalyst.

Reverse impact represents the distance, in inches, of drop required for a one half pound steel ball to cause failure on the reverse side of a panel of one eighth inch thickness.

Craze resistance is determined by thermal cycling a lap-strake panel three times from room temperature to 300° F. and checking visually for cracks.

Paint adhesion is determined by applying ten razor blades in a jig to a painted surface to thereby cut in one direction, applying the blades to the painted surface to cut in a transverse direction to give a cross-hatched surface, applying Scotch brand tape to the cross-hatched surface, pulling off the tape, and observing the amount of paint affixed to the tape.

Izod impact is expressed in inch-pounds and is determined according to A.S.T.M. D-256.

Flexural strength and flexural modulus are determined according to A.S.T.M. D-790.

Tensile strength is obtained according to A.S.T.M. D-638.

Water resistance is determined according to A.S.T.M. D-570.

The following examples will further illustrate this invention. All parts are by weight unless otherwise stated.

*Example 1.*—The unsaturated polyester used in the subsequent examples was prepared by charging 8.11 moles maleic anhydride (795 grams), 2.7 moles phthalic anhydride (400 grams) and 11.9 moles propylene glycol (904 grams) to a 5-liter, 3-necked flask, equipped with a mechanical stirrer, thermometer, nitrogen inlet tube and steam condenser. The mixture was heated to 200° C. and reacted under a nitrogen atmosphere to an acid number less than 35 (about 8.0 hours). Water of condensation was removed during the reaction through the steam condenser and collected in a receiver submerged in ice water. After polyesterification was complete, the polyester was cooled to 150° C. and hydroquinone (0.014 weight percent based on the weight of the unsaturated polyester) was added. Styrene was then added at 100° C. to give a solution containing 30 weight percent styrene.

*Example 2.*—A premix was prepared by charging 440 grams of unsaturated polyester-styrene solution described in Example 1, 220 grams of a mixture of 40 weight percent cyclic ester polymer-60 percent styrene mixture, 1.76 grams tert-butylperbenzoate, 1.4 grams of "Lupersol 130" (90 weight percent 2,5-dimethyl-2,5-bis(tertiarybutylperoxy)hexyne 3,10 weight percent dimethyl phthalate), 4.0 grams zinc stearate, 2.0 grams black iron oxide, and 0.044 gram para-benzoquinone to a Hobart mixer and mixing for 15–30 minutes. 320 grams of calcium carbonate of an average particle size of about 2 microns, 320 grams of calcium carbonate of an average particle size of about 5–10 microns, and 440 grams of clay filler ("ASP–400," an aluminum silicate clay having an average particle size of about 5 microns) were then added and the hole was mixed for 15–30 minutes. Finally, 300 grams of ¼" chopped glass fiber was added and mixed until fiber wetting was apparent (3–5 minutes).

The premix material was molded in a 14" x 18" x ⅛" matched-metal tray mold. 960 grams of the premix material was charged to a pre-heated (330° F.) matched-metal mold and molded for 2–3 minutes under about 500 p.s.i.g. at a temperature of about 310° F. The trays were then removed from the press, cooled and tested. The results, using two different cyclic ester polymers, were excellent, and are reported in Table I.

TABLE I.—INFLUENCE OF CYCLIC ESTER POLYMERS ON PROPERTIES OF PREMIX MOLDINGS

| Thermoplastic additive | Percent-age[1] | Results |
|---|---|---|
| None | | Very poor surface profile, poor gloss and surface cracks. |
| PCL (0.3) | 5.0 | Excellent surface profile, high gloss. |
| PCL (1.89) | 5.0 | Do. |

[1] Based on weight of molded part.

*Example 3.*—A preform molding material was prepared by admixing 1050 grams of unsaturated polyester-styrene solution prepared as described in Example 1 with 350 grams of cyclic ester polymer solution in styrene (60 weight percent styrene), 600 grams clay filler ("Al-Sil-Ate LO"),* 4.2 parts tertiarybutyl peroctotate, and 7.0 parts of a mold release ("Zelec UN," Du Pont) to a high speed mixer and mixing for about 30 minutes.

Moldings were prepared from this material by charging 70 grams thereof and 30 grams of fiber glass mat to a matched-metal mold. The molding cycle was 2.0 minutes at 275° C. under 500 p.s.i.g. On opening the mold the molding was removed, allowed to cool for 2.0 hours and tested. The various cyclic ester polymers used and the results obtained are given in Table II.

Referring to Table II, it will be noted that the use of cyclic ester polymers resulted in moldings exhibiting excellent properties. Both the paint adhesion and reverse impact resistance were excellent, in distinct contrast to the corresponding results arising from the use of the prior art's poly(methyl methacrylate).

*Example 4.*—Using the procedure described in Example 3, preform laminates were prepared using varying amounts of PCL(0.3) cyclic ester polymer, so as to result in laminates containing, respectively, 2.5, 5, and 7.5 weight percent PCL(0.3) cyclic ester polymer, based on the overall weight of the laminate. The results are given in Table III.

Referring to Table III, it will be noted that good results were obtained at all three levels of PCL(0.3) cyclic ester polymer content, with optimum results being obtained at a content of 5.0 weight percent.

TABLE III.—INFLUENCE OF EPSILON-CAPROLACTONE POLYMER CONCENTRATIONS ON PROPERTIES OF PREFORM LAMINATES

| Weight Percent PCL (0.3) | 2.5 percent | 5 percent | 7.5 percent |
|---|---|---|---|
| Low profile characteristics | Good | Excellent | Excellent. |
| Reverse impact, inches | 15 | 15 | 15. |
| Paint adhesion | Excellent | Excellent | Good. |

*Example 5.*—The following molding formulation was prepared.

|  | Parts |
|---|---|
| Unsaturated polyester[1] (36.5%)[2] | 1050 |
| Cyclic ester polymer solution[3] (12.1%) | 350 |
| Clay filler ("Al-Sil-Ate LO") (20.0%) | 600 |
| "Lupersol 256" (0.15%) | 4.2 |
| Mold release ("Zelec UN" (0.25%) | 7.0 |

[1] Prepared as described in Example 1.
[2] Percentages are based on total molding weight; i.e., molding compound plus glass.
[3] 40 weight percent cyclic ester polymer, 60 weight percent styrene.

This molding formulation was poured onto glass mat (30.2 weight percent of the total molding) and molded in a matched-metal mold for 2.0 minutes at 275° F. and 500 p.s.i.g. Table IV identifies the particular cyclic ester polymer employed and gives the results obtained. The superior results obtained when using a polymer of a cyclic ester are evident.

TABLE IV

| Cyclic ester polymer | MCR[1] micro, in./in. | Reverse impact | Barcol hardness | Gloss |
|---|---|---|---|---|
| None | 1,200 | 2 | 60 | Poor |
| PCL (0.3) | 170 | 12 | 3 | Excellent. |
| PCL (1.89) | 172 | 12 | 3 | Do. |
| PVD (0.48) | 172 | 12 | 20 | Do. |
| CL/MCL (1.39) | 665 | 8.0 | 3 | Good. |
| CL/ETO (0,28) | 1,200 | 10 | 0 | Do. |

[1] MCR (surface waviness) was measured using a Microcorder; low readings indicate very smooth surfaces.

Variations can of course be made without departing from the spirit of the invention.

What is claimed is:

1. A curable composition characterized by little or no shrinkage during the cure thereof and wherein the cured composition is characterized by superior impact resistance, said curable composition comprising a mixture of (1) a polyester having ethylenic unsaturation, (2) an eth-

*Burgess Pigment Co.

TABLE II.—PROPERTIES OF PREFORM MOLDINGS

| Additive | None | PMM[1] | PCL (0.3) | PCL (1.89) | PCL Mixture |
|---|---|---|---|---|---|
| Percentage, based on weight of Molding | | 5.0 | 5.0 | 5.0 | 5.0 |
| Low profile characteristics | (3) | (4) | (4) | (4) | (4) |
| Surface waviness, micro inches/inch | 1,500 | 180 | 170 | 172 | 170 |
| Reverse impact, inches | 2 | 2 | 15 | 15 | 15 |
| Craze resistance | (5) | (4) | (4) | (4) | (4) |
| Pain adhesion | (4) | (3) | (4) | (4) | (4) |
| Bonding adhesion, urethane adhesions | (4) | (4) | (4) | (4) | (4) |
| Izod impact [6] | | 14 | 20 | 20.3 | 18.6 |
| Flexural strength, p.s.i. | | | 23,600 | | 26,100 |
| Flexural modulus, p.s.i.×10⁶ | | | .92 | | .94 |
| Tensile strength, p.s.i. | | 15,000 | 14,300 | | 14,300 |
| Water resistance: Flexural strength after 2 hour H₂O boil, p.s.i. | | | 17,500 | | 21,400 |
| Flexural strength retention, percent | | | 74.2 | | 82.0 |
| Flexural modulus after 2 hour H₂O boil | | | .73 | | .83 |
| Retention, percent | | | 79.3 | | 88.3 |

[1] Poly(methyl methacrylate), [Rohm and Haas].
[2] 50/50 parts by weight of PCL(0.3) and PCL(1.89).
[3] Very poor.
[4] Excellent.
[5] Poor.
[6] Un-notched.

ylenically unsaturated compound copolymerizable therewith, said compound being present in an amount of from about 10 to about 60 weight percent by weight of the mixture of said polyester plus said compound, and (3) a linear polymer of a cyclic ester, said polymer having a reduced viscosity value of at least about 0.15, and being characterized by the recurring structural unit

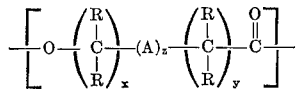

wherein each R, individually, is hydrogen, alkyl, halo or alkoxy; wherein A is the oxy group; wherein $x$ is an integer from 1 to 4; wherein $y$ is an integer from 1 to 4; wherein $z$ is an integer of zero or one; with the provisos that (a) the sum of $x+y+z$ is at least 2 and not greater than 7, and (b) the total number of R variables which are substituents other than hydrogen does not exceed 3; said linear polymer of a cyclic ester being present in an amount of from about 1 to 40 weight percent by weight of said mixture.

2. The composition of claim 1 wherein said linear polymer of a cyclic ester is further characterized by the recurring structural unit

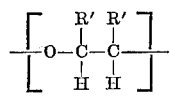

wherein each R', individually, is hydrogen, alkyl, cycloalkyl, aryl, or chloroalkyl, or wherein the two R' variables together with the ethylene moiety of the oxyethylene chain form a saturated cycloaliphatic hydrocarbon ring which has from 4 to 8 carbon atoms.

3. The composition of claim 1 wherein said recurring structural unit of said cyclic ester polymer is oxypentamethylenecarbonyl.

4. The composition of claim 1 wherein said recurring structural unit of said cyclic ester polymer is oxytetramethylenecarbonyl.

5. The composition of claim 1 wherein said polyester is the product from the esterification reaction of an admixture containing a dihydric alcohol and an ethylenically unsaturated dicarboxylic acid.

6. The composition of claim 5 wherein said dihydric alcohol is dipropylene glycol and said ethylenically unsaturated dicarboxylic acid is maleic acid.

7. The composition of claim 5 wherein said ethylenically unsaturated compound is styrene.

8. The composition of claim 6 wherein said ethylenically unsaturated compound is styrene or vinyl toluene.

9. The composition of claim 5 wherein said polyester is the product from the esterification reaction of an admixture containing a dihydric alcohol, an ethylenically unsaturated dicarboxylic acid, and a saturated dicarboxylic acid.

10. The composition of claim 9 wherein said dihydric alcohol is propylene glycol, said unsaturated acid is maleic acid, and said saturated acid is phthalic acid.

11. The composition of claim 9 wherein said dihydric alcohol is propylene glycol, said unsaturated acid is maleic acid, and said saturated acid is isophthalic acid.

12. The composition of claim 10 wherein said ethylenically unsaturated compound is styrene.

13. The composition of claim 11 wherein said ethylenically unsaturated compound is styrene.

14. The composition of claim 1, additionally containing a filler.

15. The composition of claim 14 wherein said filler comprises fiber glass, clay, calcium carbonate, hydrated alumina, mica, quartz, talc, or magnesium silicate.

16. The composition of claim 1, additionally containing a curing catalyst.

17. The composition of claim 16 wherein said curing catalyst is an organic peroxide.

18. The cured composition of claim 16.

No references cited.

ALLAN LIEBERMAN, Primary Examiner

L. T. JACOBS, Assistant Examiner

U.S. Cl. X.R.

260—861